(12) United States Patent
Browne et al.

(10) Patent No.: US 8,321,092 B2
(45) Date of Patent: Nov. 27, 2012

(54) PRE-COLLISION ASSESSMENT OF POTENTIAL COLLISION SEVERITY FOR ROAD VEHICLES

(75) Inventors: Alan L Browne, Grosse Pointe, MI (US); Francis D Wood, Detroit, MI (US); Osman D Altan, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/204,343

(22) Filed: Aug. 5, 2011

(65) Prior Publication Data

US 2011/0295467 A1    Dec. 1, 2011

Related U.S. Application Data

(60) Division of application No. 10/823,391, filed on Apr. 13, 2004, now abandoned, which is a continuation-in-part of application No. 10/355,688, filed on Jan. 31, 2003, now abandoned, which is a continuation of application No. 09/782,461, filed on Jan. 22, 2001, now Pat. No. 6,571,161.

(51) Int. Cl.
*G05D 1/00* (2006.01)
*G06F 7/00* (2006.01)

(52) U.S. Cl. ........ 701/46; 701/36; 701/45; 701/47; 701/48; 701/96; 701/117; 701/122; 701/300; 701/301

(58) Field of Classification Search .......... None
See application file for complete search history.

(56) References Cited

U.S. PATENT DOCUMENTS

| | | | |
|---|---|---|---|
| 3,097,354 A | 7/1963 | Blowney et al. | |
| 4,714,925 A | 12/1987 | Bartlett | |
| 5,143,897 A | 9/1992 | Ziemek et al. | |
| 5,226,389 A | 7/1993 | Buuck | |
| 5,270,708 A * | 12/1993 | Kamishima | 340/995.24 |
| 5,289,182 A | 2/1994 | Brillard et al. | |
| 5,317,309 A | 5/1994 | Vercellotti et al. | |
| 5,325,302 A | 6/1994 | Izidon et al. | |
| 5,508,920 A | 4/1996 | Gioutos et al. | |
| 5,540,461 A | 7/1996 | Nitschke et al. | |
| 5,546,311 A | 8/1996 | Sekine | |
| 5,563,589 A | 10/1996 | Blaimont et al. | |
| 5,684,474 A | 11/1997 | Gilon et al. | |
| 5,748,477 A | 5/1998 | Katoh | |
| 5,785,347 A | 7/1998 | Adolph et al. | |
| 5,785,377 A | 7/1998 | Itoh | |
| 5,835,007 A | 11/1998 | Kosiak | |
| 5,841,367 A | 11/1998 | Giovanni | |
| 5,845,000 A | 12/1998 | Breed et al. | |

(Continued)

*Primary Examiner* — Ian Jen
(74) *Attorney, Agent, or Firm* — Cantor Colburn LLP

(57) ABSTRACT

A method of predicting severity of a potential collision of first and second vehicles. The method includes determining that a probability of a potential collision of the vehicles is greater than a threshold value. Vehicle condition-defining signals are exchanged between the vehicles when the probability of the potential collision is greater than the threshold value including a first vehicle condition-defining signal developed on board the first vehicle and a second vehicle condition-defining signal developed onboard the second vehicle. The method further includes predicting onboard the first vehicle a severity of the potential collision for the first vehicle based upon input that includes the first vehicle condition-defining signal and the second vehicle condition-defining signal. A severity of the potential collision for the second vehicle is predicted onboard the second vehicle based upon the second vehicle condition-defining signal and the first vehicle condition-defining signal.

19 Claims, 2 Drawing Sheets

U.S. PATENT DOCUMENTS

| | | |
|---|---|---|
| 5,847,661 A | 12/1998 | Ricci |
| 5,913,910 A * | 6/1999 | Ochi et al. .................... 701/1 |
| 5,964,817 A | 10/1999 | Dalum et al. |
| 5,983,161 A | 11/1999 | Lemelson et al. |
| 5,999,871 A | 12/1999 | Liu |
| 6,012,008 A | 1/2000 | Scully |
| 6,087,928 A | 7/2000 | Kleinberg et al. |
| 6,163,755 A | 12/2000 | Peer et al. |
| 6,226,389 B1 | 5/2001 | Lemelson et al. |
| 6,226,572 B1 | 5/2001 | Tojima et al. |
| 6,275,773 B1 | 8/2001 | Lemelson et al. |
| 6,317,691 B1 | 11/2001 | Narayan et al. |
| 6,405,132 B1 | 6/2002 | Breed et al. |
| 6,571,161 B2 | 5/2003 | Browne et al. |
| 7,295,925 B2 | 11/2007 | Breed et al. |
| 7,317,987 B2 | 1/2008 | Nahla |
| 2002/0017415 A1 | 2/2002 | Campbell et al. |
| 2002/0183929 A1* | 12/2002 | Tsuji et al. .................... 701/301 |
| 2002/0198632 A1* | 12/2002 | Breed et al. .................... 701/1 |
| 2003/0006889 A1* | 1/2003 | Koike .................... 340/435 |
| 2003/0139867 A1 | 7/2003 | Browne et al. |
| 2005/0107954 A1 | 5/2005 | Nahla |
| 2005/0205331 A1* | 9/2005 | Phanumphai .................... 180/271 |
| 2006/0106538 A1* | 5/2006 | Browne et al. .................... 701/301 |
| 2007/0087756 A1 | 4/2007 | Hoffberg |

* cited by examiner

PRE-COLLISION ASSESSMENT OF POTENTIAL COLLISION SEVERITY FOR ROAD VEHICLES

CROSS REFERENCE TO RELATED APPLICATIONS

This application is a divisional of U.S. patent application Ser. No. 10/823,391 filed Apr. 13, 2004, which is a continuation-in-part of U.S. patent application Ser. No. 10/355,688 filed on Jan. 31, 2003, which is a continuation of U.S. patent application Ser. No. 09/782,461 filed on Jan. 22, 2001; and which is now issued as U.S. Pat. No. 6,571,161 issued May 27, 2003; and all of the above-mentioned patents and patent applications are incorporated by reference herein in their entirety.

TECHNICAL FIELD

The present disclosure relates generally to pre-collision warning/detection systems for road vehicles. More particularly, it relates to a system for robustly assessing the expected severity of a potential collision of two vehicles.

BACKGROUND OF THE INVENTION

Currently-available pre-collision warning/detection systems do not distinguish between two vehicles which are about the same size but which have significantly different mass and hence have critically different collision characteristics. Consequently, such pre-collision warning/detection systems are limited to (1) pre-arming of non-resettable devices, such as airbags, so that they can be deployed more rapidly in cases where the potential subsequent collision is sufficiently severe to warrant deployment, and (2) triggering non-aggressive resettable safety devices that do not interfere with the vehicle driving function, such as extendible/retractable bumpers and extendible/retractable knee bolster systems. There is a need for pre-collision warning/detection systems which not only give warning of an imminent or nearly imminent potential collision but also predict the severity of the potential collision.

BRIEF DESCRIPTION OF THE INVENTION

One aspect of the invention is a method for predicting severity of a potential collision of first and second vehicles. The method includes determining a probability of a potential collision of the vehicles. Vehicle condition-defining signals are exchanged between the vehicles when the probability of the potential collision is greater than a threshold value. The vehicle condition-defining signals include a first vehicle condition-defining signal developed on board the first vehicle and a second vehicle condition-defining signal developed onboard the second vehicle. The method further includes predicting onboard the first vehicle a severity of the potential collision for the first vehicle based upon input that includes the first vehicle condition-defining signal and the second vehicle condition-defining signal. A severity of the potential collision for the second vehicle is predicted onboard the second vehicle based upon input that includes the first vehicle condition-defining signal and the second vehicle condition-defining signal.

Another aspect of the invention is a method of predicting severity of a potential collision of first and second vehicles. The method includes determining onboard the first vehicle a probability of a potential collision of the vehicle. A vehicle condition-defining signal is developed in response to one or more of first vehicle geographic position data, first vehicle onboard sensor data, first stored vehicle identification data, and first vehicle pre-collision sensor data. The method also includes predicting onboard the first vehicle a severity of the potential collision for the first vehicle. Input to the prediction includes one or more of the first vehicle geographic position data, the first vehicle on-board sensor data, the first stored vehicle identification data, and the first vehicle pre-collision sensor data.

Another aspect of the invention is a method for predicting severity of a potential collision of first and second vehicles. The method includes determining a probability of the potential collision of the vehicles and exchanging vehicle condition-defining signals between the first and second vehicles when the probability of the potential collision is greater than a threshold value. The vehicle condition-defining signals include a first vehicle condition-defining signal and a second vehicle condition-defining signal. A severity of the potential collision for the first vehicle is predicted based on input that includes the first vehicle condition-defining signal and the second vehicle condition-defining signal. A severity of the potential collision for the second vehicle is predicted based on input that includes the first vehicle condition-defining signal and the second vehicle condition-defining signal.

A further aspect of the invention is a computer program product for predicting severity of a potential collision of first and second vehicles. The computer program product includes a storage medium readable by a processing circuit for performing a method that includes determining a probability of a potential collision of the vehicles. The method also includes exchanging vehicle condition-defining signals between the vehicles when the probability of the potential collision is greater than a threshold value. A first vehicle condition-defining signal is developed onboard the first vehicle and a second vehicle condition-defining signal is developed onboard the second vehicle. Onboard the first vehicle a severity of the potential collision for the first vehicle is predicted based on input that includes the first vehicle condition-defining signal and the second vehicle condition-defining signal. The method also predicts onboard the second vehicle a severity of the potential collision for the second vehicle based on input that includes the first vehicle condition-defining signal and the second vehicle condition-defining signal.

Another aspect of the invention is an apparatus for use onboard a first vehicle for predicting severity of a potential collision of the first vehicle and a second vehicle. The apparatus includes means for determining a probability of a potential collision between the first and second vehicles. The apparatus also includes means responsive to the determining for transmitting a first vehicle condition-defining signal developed onboard the first vehicle to the second vehicle when the probability of the potential collision is greater than a threshold value. The apparatus further includes means for receiving from the second vehicle a second vehicle condition-defining signal developed onboard the second vehicle. The apparatus also includes means for processing the first vehicle condition-defining signal and the second vehicle condition-defining signal for predicting the severity of the potential collision.

BRIEF DESCRIPTION OF THE DRAWINGS

Referring to the exemplary drawings wherein like elements are numbered alike in the several FIGURES.

DESCRIPTION OF THE INVENTION

Figure 1:
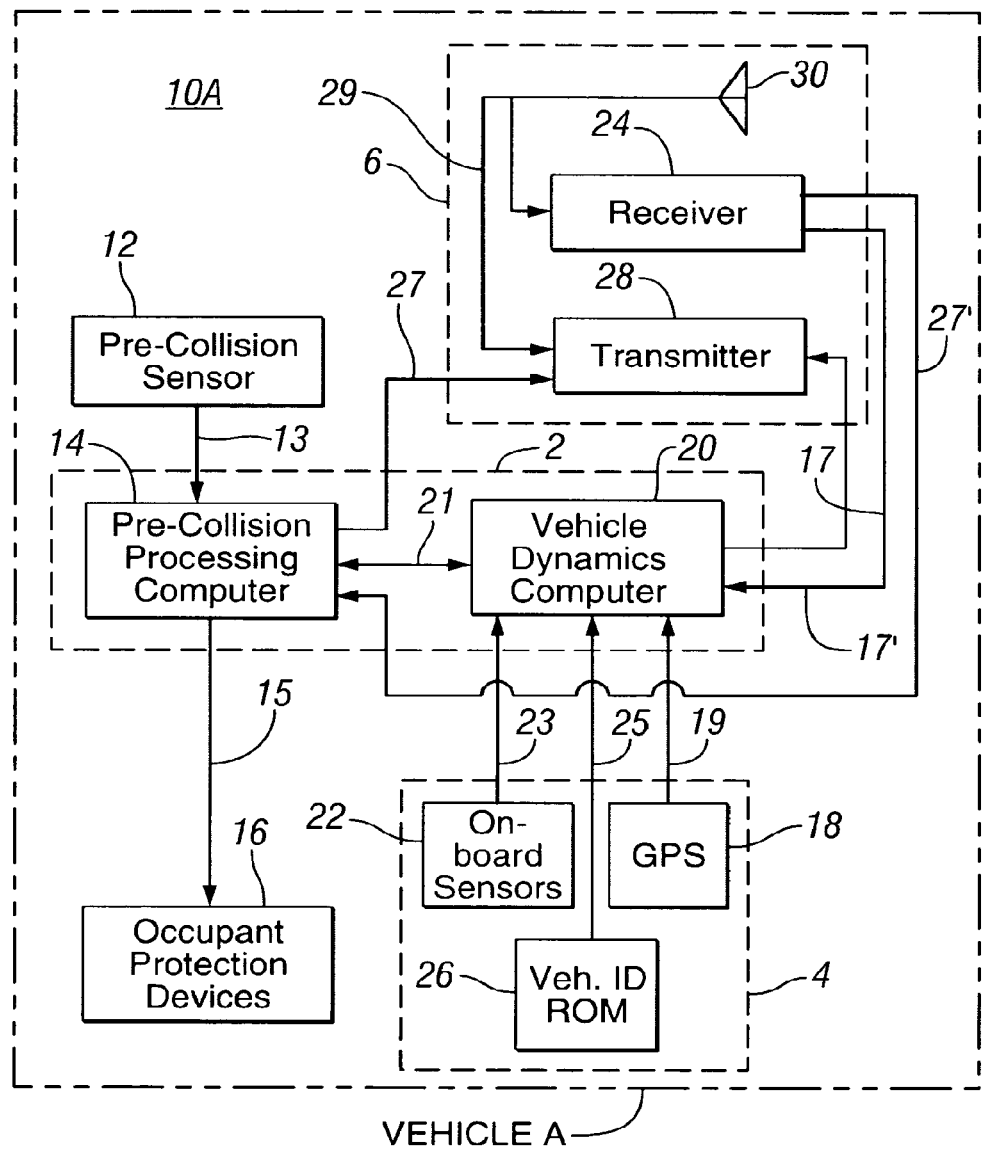
FIG. 1 is a functional block diagram which shows a collision severity prediction system installed in a first road vehicle.

In accordance with exemplary embodiments of the present invention, a method is provided which predicts the severity of an imminent or nearly imminent potential collision of two vehicles. The prediction is based upon robust vehicle condition-defining information about both vehicles. The vehicle condition-defining information about both vehicles is developed after it is detected that the collision is likely to occur and/or imminent. Alternatively, all or a subset of the vehicle condition-defining information for each vehicle is continuously developed while the vehicle is in operation and available for use in the prediction. Further, the prediction of potential collision severity is developed so that occupant safety devices can be deployed in accordance with the predicted potential collision severity. Referring now to the drawings, there is shown an illustrative embodiment of the invention which is adapted for use in controlling the deployment of passenger protection devices in land vehicles. It will be appreciated, as the description proceeds, that the invention is useful in a wide variety of applications and may be implemented in many different ways.

Figure 2:
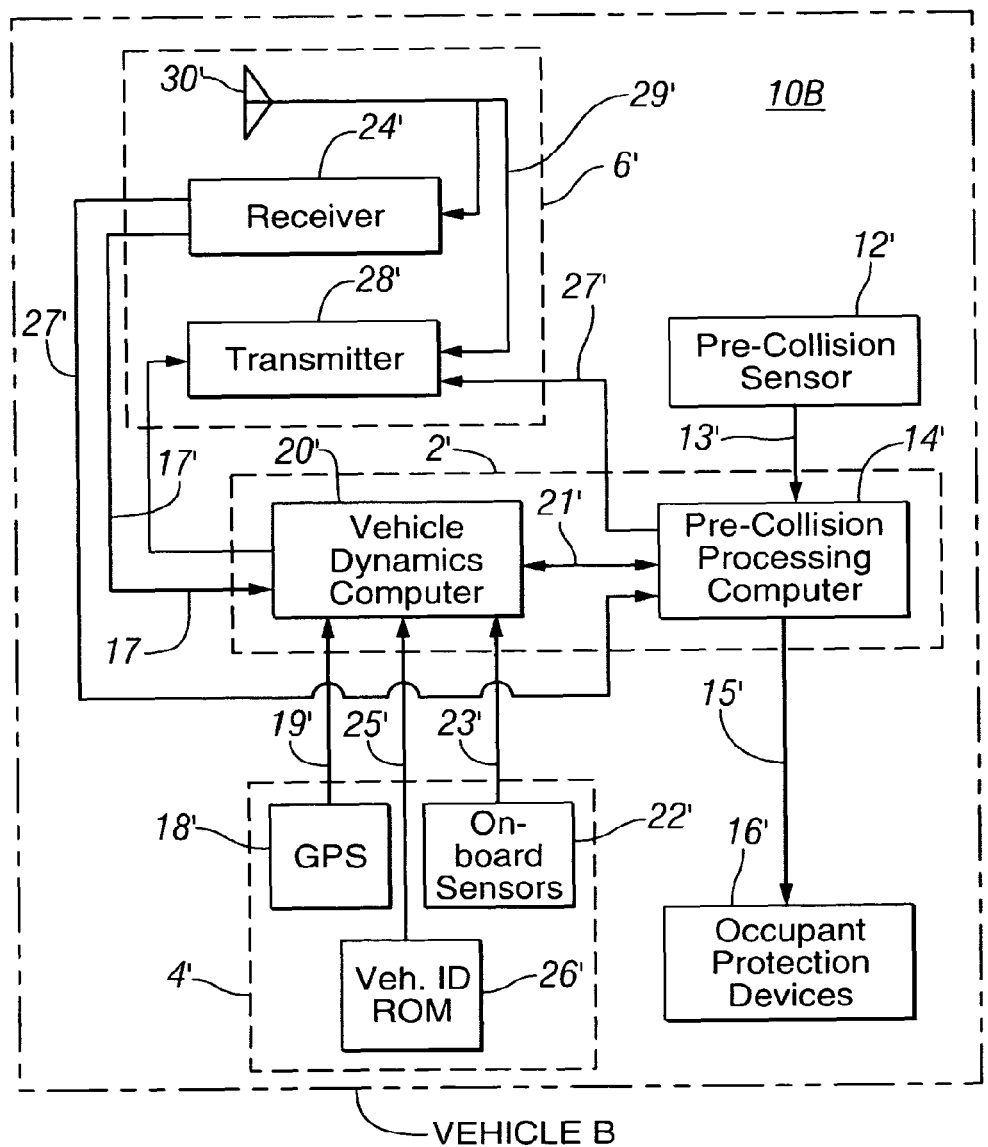
FIG. 2 is a functional block diagram of a collision severity prediction system which is identical to that of FIG. 1 but is installed in a second road vehicle.

FIG. 1 is a block diagram representation of a collision severity prediction system 10A which is installed in a vehicle A, and FIG. 2 is block diagram of an identical collision severity prediction system 10B installed in vehicle B. The collision severity prediction system 10A will be described with reference to FIG. 1; the description is applicable also to the collision severity prediction system 10B. The corresponding components of systems 10A and 10B are identified by the same reference characters except that a prime symbol is added to the reference characters in system 10B.

An overview of the collision severity prediction system 10A will be given before the system is described in detail. The system 10A comprises, in general, a computer system 2, a pre-collision sensor 12 and a communication system 6 which communicates with vehicle B. The pre-collision sensor 12 supplies the computer system 2 with closing speed, range, position and, optionally, the angle of approach between vehicles A and B. The computer system 2 also receives collision-related vehicle information (e.g., from onboard sensors 22) that may include data such as, but not limited to, vehicle collision characteristics, number of occupants, number of belted occupants, mass of the occupants, loaded mass of the vehicle, vehicle speed, tire inflation pressure, tire wear state, road friction, anti-lock brake system (ABS) operation, vehicle stability enhancement system (VSES) operation, braking pressure, amount of vehicle pitch and roll, yaw, engine status, driver demanded throttle and torque, transmission status, engine operation data, heading, and the operating status of the brakes, steering wheel and the like. This collision related vehicle information is referred to collectively as pre-collision vehicle condition signals 4. The computer system 2 predicts the severity of an imminent potential collision based upon the signals received from the pre-collision sensor 12 and the signals 4. It also develops control signals 15 for occupant protection devices 16.

The pre-collision vehicle condition signals 4 may also be utilized to perform vehicle path prediction. For example, the steering wheel position, the yaw rate in combination with the vehicle speed, and/or GPS data in conjunction with a map preview application (located onboard the vehicle or remote to the vehicle) may be utilized to predict the path of the vehicle.

The computer system 2 comprises a vehicle dynamics computer 20 and a pre-collision processing computer 14. The vehicle dynamics computer 20 receives the pre-collision vehicle condition signals 4 and operates on the signals to develop vehicle A condition-defining signals 17. Also, the vehicle dynamics computer 20 receives vehicle B condition-defining signals 17' via the vehicle A communication system 6. The vehicle dynamics computer 20 processes the vehicle A and vehicle B condition-defining signals 17 and 17' to develop vehicle A collision-defining data signals 21 which are applied to the pre-collision processing computer 14.

When a potential collision is imminent, or nearly imminent, the pre-collision processing computer 14 receives pre-collision sensor data 13 from the pre-collision sensor 12 and generates an alert or handshake signal 27 to initiate communication with vehicle B. The pre-collision processing computer 14 processes the collision-defining data signals 21 to assess the severity of the impending potential collision and to generate control signals 15 for controlling deployment of the occupant protection devices 16. In an alternate exemplary embodiment of the present invention, the pre-collision sensor data 13 is utilized by the pre-collision processing computer 14 to determine if the probability of a collision between vehicle A and vehicle B is over a threshold value. The threshold value may be pre-selected and/or it may vary during the operation of the vehicle based on factors such as vehicle speed, outside air temperature, whether the vehicle is in park and driver characteristics such as workload and driver state. In exemplary embodiments of the present invention, the threshold value represents an imminent potential collision or a nearly imminent potential collision. If the probability of the potential collision is over the threshold value, then the pre-collision processing computer 14 generates an alert or handshake signal 27 to initiate communication with vehicle B.

The communication system 6 of vehicle A comprises transmitter 28 for transmitting signals to vehicle B and comprises receiver 24 for receiving signals from vehicle B. Preferably, the transmitter and receiver operate in the manner of either a transceiver or a transponder.

The individual stages of collision-sensing prediction system 10A will now be described further in regard to function and implementation. Since the required functions of each individual stage can be realized by known designs using readily-available components, details of circuitry and structure will not be given. However, it will be helpful to provide further description, especially in respect to the function of each individual stage and the functional relationship among the different stages.

The pre-collision sensor 12 in the illustrative embodiment of FIG. 1 generates pre-collision sensor data 13 including closing speed, position, and range signals and, optionally, the angle of approach between vehicles A and B.

These signals are used to produce the pre-collision sensor data 13 when the sensed conditions indicate that a potential collision of the vehicles A and B is imminent. The pre-collision sensor data 13 is applied to the pre-collision processing computer 14.

The pre-collision sensor 12 is suitably a collision-sensing system of the type using radar or lidar or of the type using ultrasonics or vision based, or a combination (fusion). In exemplary embodiments of the present invention, the pre-collision sensor 12 is designed, such that if it survives a collision, it retains the ability to detect a second subsequent impact. The collision-sensing system itself should be capable of measurements in the near range of 0 to at least 20 meters, preferably more, for use in assessing potential collision severity. Radar systems, lidar systems, vision systems and also ultrasonic systems are known having this capability. In alternate exemplary embodiments of the present invention, the pre-collision sensor 12 utilizes any technology (or combination of technologies) known in the art for determining the presence of other vehicles, including, but not limited to: ultra wide-band radar, pulsed radar, continuous wave radar, near radar, far radar, vision and image processing, near and far infrared systems, short range sensors, mid range sensors and long range sensors.

Alternative exemplary embodiments of the present invention utilize one or more pre-collision sensors 12 that cover a full three hundred and sixty degrees around the vehicle to cover all possible angles of approach. In addition to increasing visibility to possible potential collisions, this may also be utilized to coordinate the deployment of occupant protection devices for the predicted impacts. The coordination may include determining an order of predicted occurrences in multi-vehicle impacts. A full three hundred and sixty degree view around the vehicle may also be utilized to alert vehicles within a pre-selected or varying radius of the vehicle to the impending potential collision and the potential need by them and/or their operators to start taking evasive action in order to not be involved in subsequent related impacts (i.e., initiate a collision avoidance function).

The pre-collision processing computer 14 is a digital computer which computes an assessment of the severity of an imminent potential collision based upon collision-defining data signals 21 from the vehicle dynamics computer 20 which represent the relative speed, angle and location of impact, energy levels of the vehicles and, if available, crush forces associated with predicted locations of impact. Based upon the data signals 21, the pre-collision processing computer 14 computes a prediction of the severity of an imminent potential collision and produces control signals 15 for controlling actuation of occupant protection devices 16 which may include but are not limited to airbags, seat belts, extendible/retractable bumpers and knee bolsters. In alternate exemplary embodiments of the present invention, additional occupant protection devices 16 may be armed and/or extra deployment capacity may be reserved to cover instances where there is a possibility of a second impact subsequent to, and possibly resulting from, the occurrence of the first impact.

When a potential collision is imminent, or nearly imminent, the pre-collision processing computer 14 is operative in response to the pre-collision sensor data 13 from the pre-collision sensor 12 to generate a handshake signal 27 which is applied to the transmitter 28 for transmission to vehicle B. This initiates transmission from vehicle B of a return handshake signal 27' (generated by the pre-collision processing computer 14') to vehicle A which is supplied by the receiver 24 to the pre-collision processing computer 14. Upon receipt of the return handshake signal 17', the vehicle dynamics computer 20 is activated to exchange vehicle condition-defining signals 17 and 17' with vehicle dynamics computer 20'. In an alternate exemplary embodiment of the present invention, the pre-collision sensor data 13 is utilized by the pre-collision processing computer 14 to determine if the probability of a potential collision between vehicle A and vehicle B is over a threshold value that may be pre-selected or varying based on driver, environmental and/or vehicle characteristics. If the probability of the collision is over the threshold value, then the pre-collision processing computer 14 generates an alert or handshake signal 27 to initiate communication with vehicle B.

In alternate exemplary embodiments of the present invention, a three hundred and sixty degree view around the vehicle may be utilized to detect impacts involving multiple vehicles. When impacts involving multiple vehicles are detected as being imminent, the individual impact events may be ordered in terms of predicted timing and severity. A prioritization selection process is then utilized to deploy those occupant protection devices predicted to have the greatest overall effect. Other embodiments include deploying occupant protection devices 16 early which may allow them to be deployed less aggressively. Occupant protection devices 16 may also be deployed for a longer period of time than in events in which only a single impact is predicted, in order to cover the full duration of the multiple impacts. In addition, the prediction capability in events involving single impacts may be extended to predicting the vehicle trajectory after impact and thus the prediction of additional subsequent impacts (including for example rollover) resulting from the change in trajectory due to the first impact. For example, calculation of the potential collision related change in vehicle trajectory is within the capability of commercially available accident reconstruction programs.

The vehicle dynamics computer 20 is a digital computer which receives the pre-collision vehicle condition signals 4 and develops the collision-defining data signals 21 which are supplied to the pre-collision processing computer 14. The pre-collision vehicle condition signals 4 are supplied from a vehicle identification read only memory (ROM) (referred to as stored vehicle identification data 26), onboard sensors 22 and, optionally, a global positioning system (GPS) 18. The information obtained from these sources taken with that from the pre-collision sensor 12 is sufficient for the vehicle dynamics computer 20 to develop the vehicle A condition-defining signals 17.

The vehicle A condition-defining signals 17 are applied to transmitter 28 which transmits the signals to the receiver 24' of vehicle B and thence the signals 17 are applied to the vehicle dynamics computer 20'. In an alternative exemplary embodiment of the present invention, vehicle A sends vehicle condition-defining signals 17 to the receiver 24' of vehicle B without waiting for the return handshake 27' from vehicle B.

Vehicle dynamics computer 20 also receives the vehicle B condition-defining signals 17' which are transmitted from vehicle B and applied to the receiver 24 and thence to the vehicle dynamics computer 20. The vehicle B condition-defining signals 17' contain collision-related information of the same type as that which is contained in the vehicle A condition-defining signals 17.

The vehicle dynamics computer 20 processes the vehicle condition-defining signals 17 and 17' of vehicles A and B and develops the collision-defining data signals 21 representing the relative speed, energy levels of the two vehicles, location of impact and, subject to data availability, crush forces that will be generated at such locations.

The pre-collision vehicle condition signals 4 in the illustrative embodiment are supplied from the vehicle identification read only memory (ROM) (referred to as stored vehicle identification data 26), onboard sensors 22 and optionally a GPS 18.

The stored vehicle identification data 26 defines characteristics of vehicle A related to the collision worthiness of the vehicle. Such characteristics may include mass, dimensions, bumper height, vehicle height, height of the vehicle center of gravity, and collision pulse of the vehicle. Vehicle identification signals 25 such as stored vehicle identification data 26 are read from the ROM into the vehicle dynamics computer 20.

The GPS 18 supplies GPS signals 19 which enable the vehicle dynamics computer to develop position, heading and speed of the vehicle. In addition, a map database may take the GPS data point and compare it to a map to provide information about what permanent objects are located around the vehicle.

The on-board sensors 22 in the illustrative embodiment supply the vehicle dynamics computer 20 with vehicle onboard sensor data 23 representing information such as speed, acceleration, yaw rate, steering wheel position, braking status, throttle position, and transmission status.

In the illustrative embodiment of the invention, the communication system 6 comprises receiver 24 and transmitter 28. The receiver 24 and the transmitter 28 are preferably coupled in a manner so as to operate as a transceiver with the common antenna 30. The transmitter 28 receives signals 27 from the pre-collision processing computer 14 and also receives signals 17 from the vehicle dynamics computer 20 and transmits output signals 29 which are received by the receiver 24' of the collision severity prediction system 10B of vehicle B. The input signals to the transmitter 28 include the handshake signal 27 and the vehicle A condition-defining signal 17 from the vehicle dynamics computer 20. The receiver 24 is adapted to receive input signals including a handshake signal and the condition-defining signal 17' transmitted by the collision severity prediction system 10B of vehicle B. The process of exchanging information must be accomplished within a matter of milliseconds, such as a maximum period of 10 to 20 milliseconds. In exemplary embodiments of the present invention, the transmitter 28 and receiver 24 are designed, such that if they survive a collision, they retain the ability to communicate in the event of a second subsequent impact.

In an alternative communication system (not shown), information is exchanged between vehicles using the pre-collision sensor 12 and modulating its emitted carrier wave to represent the information to be exchanged.

As another alternative, exchanging information between the vehicles can be done, once an imminent potential collision has been detected, by using a satellite-based system. In an exemplary embodiment of the present invention, the satellite-based system is the commercially available ONSTAR system from General Motors Corporation. ONSTAR is a registered trademark of General Motors Corporation.

Another alternative is a transponder system using a frequency band exclusively reserved for vehicle collision safety systems. In a transponder system, information is exchanged by a signal transmission from one vehicle to the other which triggers the automatic return of a signal transmission by a transponder on the other vehicle.

Exemplary embodiments of the present invention may be modified to utilize Federal Communications Commission (FCC) approved bands for vehicle to vehicle communication and for vehicle to infrastructure communication.

The occupant protection devices 16 include but are not limited to non-resettable devices such as air bags and resettable safety devices such as extendable and retractable bumpers, extendable and retractable knee bolster systems, and seat belt pre-tensioning systems. The timing and extent of deployment of each of these devices is controlled by control signals 15.

It will be understood that the full benefits of this invention will be realized when both vehicles involved in an impending potential collision are equipped with the collision severity prediction system 10A. Accordingly, the operation will now be described in the situation in which the two vehicles A and B are involved.

In the case where the two vehicles A and B are closing on each other, it will be assumed that the pre-collision sensor 12 of vehicle A is the first to transmit a pre-collision sensor data 13 when a potential collision of the vehicles is imminent. The pre-collision processing computer 14 supplies a handshake signal 27 to the transmitter 28, and the signal is detected by the receiver 24' of vehicle B. This causes the transmitter 28' of vehicle B to send a return handshake signal 27' which is detected by receiver 24 of vehicle A and applied to the pre-collision processing computer 14. This establishes communication between the vehicles with vehicle A having preempted the initiation of information exchange between them. The vehicle dynamics computer 20 of vehicle A responds to the return handshake signal by applying the vehicle A condition-defining signals 17 to the transmitter 28 which sends it to vehicle B which, in turn, applies the signal to the vehicle dynamics computer 20' of vehicle B. Immediately after vehicle B sends the return handshake signal, it also sends the vehicle B condition-defining signals 17' to vehicle A which applies those signals to the vehicle dynamics computer 20.

The vehicle dynamics computer 20 of vehicle A processes the vehicle A and vehicle B condition-defining signals 17 and 17' and develops the collision-defining data signals 21 which are applied to the pre-collision processing computer 14 of vehicle A. The pre-collision processing computer 14 processes the collision-defining data signals 21 to predict the severity of the imminent potential collision and to develop control signals 15 which determine the timing and extent of deployment of the associated occupant protection devices 16.

Similarly, in vehicle B, the vehicle dynamics computer 20' processes the vehicle A condition-defining signals 17 and the vehicle B condition-defining signals 17' and develops the collision-defining data signals 21' which are applied to the pre-collision computer 14'. The pre-collision processing computer 14' predicts the severity of the imminent potential collision and develops the control signals 15' which determine the timing and extent of deployment of the associated occupant protection devices 16'.

Exemplary embodiments of the present invention may be integrated and/or linked with collision avoidance systems (with larger range detect and broadcast capabilities than necessarily required by the collision imminence detection/broadcast system) so that as the probability of successful avoidance decreases, the system switches from collision avoidance as its primary function to information exchange and collision preparation. Utilizing an integrated system allows information from devices, such as sensors and detectors, to be shared between the various functions. In an integrated system, stages of operation move from tracking to collision avoidance to warning (probability of a collision increasing) to collision imminence. The output of this system may be utilized to send data (e.g., warnings) to workload estimator systems on other vehicles within a broadcast radius. The workload estimator systems could then act to focus the vehicle operator's attention on the potential collision that is becoming more imminent through actions such as turning off the radio, broadcasting a collision warning/avoidance action needed message to the operator, and tightening seatbelts. In alternate exemplary embodiments, short and mid-range sensors are integrated with one or more long range sensors such as an adaptive cruise control sensor, a blind zone detection sensor, and/or a side object detection sensor for earlier detection of surrounding vehicles.

An exemplary embodiment of the present invention is a method of predicting the severity of a potential collision of first and second vehicles. A probability of a potential collision is compared to a threshold value to determine, or detect, when the probability of the potential collision is greater than the threshold value. The determination is made by the pre-collision processing computer 14 in response to input data such as pre-collision sensor data 13 and pre-collision vehicle condition signals 4. The threshold value may be a threshold representing an imminent potential collision, a nearly imminent potential collision or alternatively that a vehicle is within a pre-selected or varying radius of the vehicle. In an exemplary embodiment of the present invention, a potential collision is imminent when the estimated percentage chance, or probability, that the potential collision will occur is greater than a first threshold value (e.g., 90%, 99%, 99.9%) and the potential collision is nearly imminent when the probability is greater than a second threshold value (e.g., 70%, 80%, 90%).

By determining if a potential collision is nearly imminent, the amount of lead-time between the prediction of a potential collision and the actual collision may be increased. This may allow for more actions to be taken to mitigate the impact of the potential collision, but may also lead to a greater number of false collision predictions (i.e., more instances where the collision does not occur after being predicted). The determination that a potential collision is nearly imminent may be utilized by the pre-collision processing computer 14 to prepare occupant protection devices for the possibility of a potential collision. Based on knowledge about the nearly imminent potential collision (e.g., predicted severity, possible places of impact), occupant protection devices may be set to particular values and/or deployed (e.g., select airbag inflation level, change knee bolster position) in response to receiving the prediction of a nearly imminent potential collision. Additional reversible protection devices and irreversible protection devices may then be deployed when (and if) a determination is made that the potential collision is imminent. This may be implemented by having more than one threshold value with different events occurring based on which threshold value has been exceeded by the probability of the potential collision. Any implementation that allows different actions to be initiated based on the probability of the potential collision may be utilized by exemplary embodiments of the present invention.

Input to calculating the probability includes pre-collision sensor data 13 that is collected by the one or more pre-collision sensors 12. The pre-collision sensor data 13 includes data such as closing speed, range, position, and optionally angle of approach. Various algorithms may be utilized to determine the probability of the potential collision occurring. The probability of the potential collision increases as the distance between the two vehicles decreases and as the estimated time until the potential collision decreases. Input to calculating the probability may also include driver state data such as the estimated alertness of the driver, the attentiveness of the driver (e.g., is driver tuning radio and/or talking on a phone) and the gaze direction of the driver. The probability of the potential collision may be increased or decreased based on the driver state data. In addition, the probability of the potential collision may be increased or decreased based on environmental data. Any data that is available to the pre-collision processing computer 14 may be utilized in calculating the probability. Input to determining that the probability of the potential collision of the vehicles is greater than the threshold value may include the probability of the potential collision occurring, a rate of change of the probability of the potential collision occurring, or both. A high rate of change (increase) of the probability may indicate that the potential collision is imminent or nearly imminent. In addition, it may be determined that the probability is greater than the threshold value if the first vehicle is less than a particular distance from the second vehicle, if the vehicles are closing in on each other and/or the estimated time until the potential collision is less than a pre-determined amount of time.

Vehicle condition-defining signals are exchanged between vehicle A and vehicle B once it has been determined that the probability of a potential collision of the vehicles is greater than the threshold value. The vehicle condition defining signals include a first vehicle condition-defining signal 17 developed onboard the first vehicle and a second vehicle condition-defining signal 17' developed onboard the second vehicle. As described previously, the vehicle condition defining signals are developed from data that includes pre-collision sensor data 13 and pre-collision vehicle condition signals 4 such as vehicle geographic position data (e.g., from a GPS 18), from vehicle onboard sensors 22 and stored vehicle identification data 26 calculated/developed on continuous basis. The vehicle condition-defining signals may be developed on a continuous basis onboard each vehicle and ready for exchange as soon as the potential collision is greater than a threshold value. Alternatively, the vehicle condition-defining signals may be developed in response to determining that that a potential collision is greater than a threshold value.

When a frontal impact is predicted, the stored vehicle identification data 26 may include data such as front bumper height, vehicle height, height of the vehicle center of gravity, frame height, and the load distribution on the face of a rigid barrier in a frontal impact, where the load distribution is determined based on a simulation or actually measured in a crash test. When a rear impact is predicted, the stored vehicle identification data 26 may include data such as rear bumper height, vehicle height, height of the vehicle center of gravity, frame height, and the load distribution on the face of a rigid barrier in a rear impact, where the load distribution is determined based on a simulation or actually measured in a crash test. When a side impact is predicted, the stored vehicle identification data 26 may include data such as rocker height, door beam height, and lateral stiffness of the vehicle corresponding to an estimated bumper location of a striking vehicle, where the lateral stiffness is obtained through a simulation or actually measured in a crash test.

As described previously, data from onboard sensors 22 may include data such as tire inflation pressure, tire wear state, road friction, anti-lock brake system operation, vehicle stability enhancement system operation, braking pressure, amount of vehicle pitch and roll, yaw, engine status, engine operation data, environmental data, and any other available information that could be useful to the predicting the severity of the potential collision. Environmental data may include information such as time of day, outside air temperature, current weather conditions, rain, and slush covered pavement surface. Time of day may be utilized to indicate whether the outside light level is daylight, nighttime or dusk Onboard the first vehicle (e.g., vehicle A), a prediction is made about the severity of the potential collision for the first vehicle based on input such as the first vehicle condition-defining signal 17 and the second vehicle condition-defining signal 17'. Similarly, onboard the second vehicle (e.g., vehicle B), a prediction is made about the severity of the potential collision for the second vehicle based on input such as the first vehicle condition-defining signal 17 and the second vehicle condition-defining signal 17'. In addition, where more than one vehicle is predicted to be in a potential collision with either the first or second vehicle, an estimate of the order of potential collision occurrence is performed. In this manner, the vehicle may selectively deploy or set a control on occupant protection devices 16 based on an expected order of potential collision occurrence. Based on the predicted severity, occupant protection devices 16 may be deployed or controls may be set on occupant protection devices 16. In addition, the occupant protection devices 16 may be controlled based on driver and/or passenger (front and back) characteristics such as position, size, weight and seat belt buckle status. In an alternate exemplary embodiment of the present invention, the estimated percentage chance of the potential collision may be broadcast to other vehicles within a pre-specified radius or to a mobile application service (e.g., an ONSTAR system that is commercially available from General Motors Corporation, where ONSTAR is a registered trademark of General Motors Corporation) to alert them of the impending potential collision.

A method of and apparatus for predicting the severity of an imminent or nearly imminent potential collision of two vehicles is described above. The prediction of severity is early enough so that the timing and extent of deployment of occupant protection devices 16 can be controlled in accordance with the predicted potential collision severity.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of predicting severity of a potential collision of first and second vehicles using a computer processor, the method comprising:
   determining a probability of the potential collision of the vehicles, wherein input to the determining includes a rate of change of an estimated percentage chance of the potential collision occurring;
   exchanging vehicle condition-defining signals between the first and second vehicles when the probability of the potential collision is greater than a threshold value, the vehicle condition-defining signals including a first vehicle condition-defining signal developed onboard the first vehicle and a second vehicle condition-defining signal developed onboard the second vehicle;
   predicting onboard the first vehicle a severity of the potential collision for the first vehicle based on input including the first vehicle condition-defining signal and the second vehicle condition-defining signal;
   predicting onboard the second vehicle a severity of the potential collision for the second vehicle based on input including the first vehicle condition-defining signal and the second vehicle condition-defining signal; and
   transmitting a command to an occupant protection device comprising an airbag, seat belt extendible bumper, retractable bumper or knee bolster, or a combination thereof, on at least one of the first vehicle or the second vehicle, the command responsive to the probability of the potential collision.

2. The method of claim 1 wherein input to the determining includes pre-collision sensor data collected by one or more pre-collision sensors.

3. The method of claim 2 wherein the pre-collision sensor data includes closing speed, range and position.

4. The method of claim 2 wherein the pre-collision sensor data includes one or more of closing speed, range, position, and angle of approach.

5. The method of claim 2 wherein at least one of the pre-collision sensors provides a three hundred and sixty degree view around at least one of the first vehicle and the second vehicle.

6. The method claim 2 wherein the pre-collision sensors collect pre-collision sensor data by utilizing one or more of ultra wide-band radar, pulsed radar, continuous wave radar, near radar, far radar, near and far infrared, vision and image processing, short range sensors, mid range sensors, and long range sensors.

7. The method of claim 1 wherein input to the determining includes an estimated percentage chance of the potential collision occurring.

8. The method of claim 1 wherein input to the determining includes an estimated percentage chance of the potential collision occurring and a rate of change of the estimated percentage chance of the potential collision occurring.

9. The method of claim 1 wherein the vehicle condition-defining signals are developed in response to one or more of vehicle geographic position data, vehicle onboard sensor data, stored vehicle identification data, and pre-collision sensor data.

10. A method of predicting severity of a potential collision of first and second vehicles using a computer processor, the method comprising:
    determining a probability of the potential collision of the vehicles;
    exchanging vehicle condition-defining signals between the first and second vehicles when the probability of the potential collision is greater than a threshold value, the vehicle condition-defining signals including a first vehicle condition-defining signal developed onboard the first vehicle and a second vehicle condition-defining signal developed onboard the second vehicle; wherein the vehicle condition-defining signals are developed in response to stored vehicle identification data comprising one or more of front bumper height, vehicle height, height of the vehicle center of gravity, frame height, and the load distribution that the vehicle would create on the face of a rigid barrier in a frontal impact, wherein the load distribution is determined based on a simulation or actually measured in a crash test;
    predicting onboard the first vehicle a severity of the potential collision for the first vehicle based on input including the first vehicle condition-defining signal and the second vehicle condition-defining signal;
predicting onboard the second vehicle a severity of the potential collision for the second vehicle based on input including the first vehicle condition-defining signal and the second vehicle condition-defining signal; and
transmitting a command to an occupant protection device, the command responsive to the probability of the potential collision.

11. A method of predicting severity of a potential collision of first and second vehicles using a computer processor, the method comprising:
determining a probability of the potential collision of the vehicles;
exchanging vehicle condition-defining signals between the first and second vehicles when the probability of the potential collision is greater than a threshold value, the vehicle condition-defining signals including a first vehicle condition-defining signal developed onboard the first vehicle and a second vehicle condition-defining signal developed onboard the second vehicle; wherein the vehicle condition-defining signals are developed in response to stored vehicle identification data comprising one or more of rear bumper height, vehicle height, height of the vehicle center of gravity, frame height, and the load distribution that the vehicle would create on the face of a rigid barrier in a rear impact, wherein the load distribution is determined based on a simulation or actually measured in a crash test;
predicting onboard the first vehicle a severity of the potential collision for the first vehicle based on input including the first vehicle condition-defining signal and the second vehicle condition-defining signal;
predicting onboard the second vehicle a severity of the potential collision for the second vehicle based on input including the first vehicle condition-defining signal and the second vehicle condition-defining signal; and
transmitting a command to an occupant protection device, the command responsive to the probability of the potential collision.

12. A method of predicting severity of a potential collision of first and second vehicles using a computer processor, the method comprising:
determining a probability of the potential collision of the vehicles;
exchanging vehicle condition-defining signals between the first and second vehicles when the probability of the potential collision is greater than a threshold value, the vehicle condition-defining signals including a first vehicle condition-defining signal developed onboard the first vehicle and a second vehicle condition-defining signal developed onboard the second vehicle; wherein the vehicle condition-defining signals are developed in response to stored vehicle identification data comprising one or more of rocker height, door beam height, and lateral stiffness of the vehicle corresponding to an estimated bumper location of a striking vehicle, wherein the lateral stiffness is obtained through a simulation or actually measured in a crash test;
predicting onboard the first vehicle a severity of the potential collision for the first vehicle based on input including the first vehicle condition-defining signal and the second vehicle condition-defining signal;
predicting onboard the second vehicle a severity of the potential collision for the second vehicle based on input including the first vehicle condition-defining signal and the second vehicle condition-defining signal; and
transmitting a command to an occupant protection device, the command responsive to the probability of the potential collision.

13. A method of predicting severity of a potential collision of first and second vehicles using a computer processor, the method comprising:
determining a probability of the potential collision of the vehicles;
exchanging vehicle condition-defining signals between the first and second vehicles when the probability of the potential collision is greater than a threshold value, the vehicle condition-defining signals including a first vehicle condition-defining signal developed onboard the first vehicle and a second vehicle condition-defining signal developed onboard the second vehicle; wherein the vehicle condition-defining signals are developed in response to vehicle onboard sensor data comprising one or more of tire inflation pressure, tire wear state, road friction, anti-lock brake system operation, vehicle stability enhancement system operation, braking pressure, amount of vehicle pitch and roll, amount of vehicle yaw, environmental data, engine status, and engine operation data;
predicting onboard the first vehicle a severity of the potential collision for the first vehicle based on input including the first vehicle condition-defining signal and the second vehicle condition-defining signal;
predicting onboard the second vehicle a severity of the potential collision for the second vehicle based on input including the first vehicle condition-defining signal and the second vehicle condition-defining signal; and
transmitting a command to an occupant protection device the command responsive to the probability of the potential collision.

14. A method of predicting severity of a potential collision of first and second vehicles using a computer processor, the method comprising:
determining a probability of the potential collision of the vehicles;
exchanging vehicle condition-defining signals between the first and second vehicles when the probability of the potential collision is greater than a threshold value the vehicle condition-defining signals including a first vehicle condition-defining signal developed onboard the first vehicle and a second vehicle condition-defining signal developed onboard the second vehicle; wherein the vehicle condition-defining signals are developed in response to vehicle onboard sensor data comprising one or more of a number of occupants, a number of belted occupants, a mass of occupants, and a loaded mass of vehicle;
predicting onboard the first vehicle a severity of the potential collision for the first vehicle based on input including the first vehicle condition-defining signal and the second vehicle condition-defining signal;
predicting onboard the second vehicle a severity of the potential collision for the second vehicle based on input including the first vehicle condition-defining signal and the second vehicle condition-defining signal; and
transmitting a command to an occupant protection device, the command responsive to the probability of the potential collision.

15. The method of claim 1 further comprising:
transmitting a command to set a control on an occupant protection device on the first vehicle when the probability of the potential collision is greater than the threshold value, said command responsive to the severity of the potential collision for the first vehicle; and transmitting a command to set a control on an occupant protection device on the second vehicle when the probability of the potential collision is greater than the threshold value, said command responsive to the severity of the potential collision for the second vehicle.

16. The method of claim 1 further comprising transmitting a command to deploy an occupant protection device on the first vehicle when the probability of the potential collision is greater than the threshold value, the command responsive to the severity of the potential collision for the first vehicle.

17. A method of predicting severity of a potential collision of first and second vehicles using a computer processor, the method comprising:
   determining a probability of the potential collision of the vehicles;
   exchanging vehicle condition-defining signals between the first and second vehicles when the probability of the potential collision is greater than a threshold value, the vehicle condition-defining signals including a first vehicle condition-defining signal developed onboard the first vehicle and a second vehicle condition-defining signal developed onboard the second vehicle;
   predicting onboard the first vehicle a severity of the potential collision for the first vehicle based on input including the first vehicle condition-defining signal and the second vehicle condition-defining signal;
   predicting onboard the second vehicle a severity of the potential collision for the second vehicle based on input including the first vehicle condition-defining signal and the second vehicle condition-defining signal; and
   transmitting a command to an occupant protection device on the first vehicle when the probability of the potential collision is greater than the threshold value the command responsive to the probability of the potential collision, the command further responsive to one or more of driver position, driver size, driver weight, and driver seat belt buckle status.

18. A method of predicting severity of a potential collision of first and second vehicles using a computer processor, the method comprising:
   determining a probability of the potential collision of the vehicles;
   exchanging vehicle condition-defining signals between the first and second vehicles when the probability of the potential collision is greater than a threshold value the vehicle condition-defining signals including a first vehicle condition-defining signal developed onboard the first vehicle and a second vehicle condition-defining signal developed onboard the second vehicle;
   predicting onboard the first vehicle a severity of the potential collision for the first vehicle based on input including the first vehicle condition-defining signal and the second vehicle condition-defining signal;
   predicting onboard the second vehicle a severity of the potential collision for the second vehicle based on input including the first vehicle condition-defining signal and the second vehicle condition-defining signal; and
   transmitting a command to an occupant protection device on the first vehicle when the probability of the potential collision is greater than the threshold value the command responsive to the probability of the potential collision, the command further responsive to one or more of passenger position, passenger size, passenger weight, and passenger seat belt buckle status.

19. The method of claim 1 further comprising:
   transmitting a command to deploy an occupant protection device on the first vehicle when the probability of the potential collision is greater than the threshold value, said command responsive to the severity of the potential collision for the first vehicle; and
   transmitting a command to deploy an occupant protection device on the second vehicle when the probability of the potential collision is greater than the threshold value, said command responsive to the severity of the potential collision for the second vehicle.

* * * * *